United States Patent [19]

Kamada et al.

[11] Patent Number: 4,831,515

[45] Date of Patent: May 16, 1989

[54] INFORMATION PROCESSING APPARATUS FOR DETERMINING SEQUENCE OF PARALLEL EXECUTING INSTRUCTIONS IN RESPONSE TO STORAGE REQUIREMENTS THEREOF

[75] Inventors: Eiki Kamada; Yooichi Shintani; Tohru Shonai, all of Kokubunji; Shigeo Takeuchi, Hanno, all of Japan

[73] Assignees: Hitachi, Ltd.; Hitachi Microcomputer Eng., both of Tokyo, Japan

[21] Appl. No.: 827,603

[22] Filed: Feb. 10, 1986

[30] Foreign Application Priority Data

Feb. 8, 1985 [JP] Japan ................................ 60-22035

[51] Int. Cl.[4] ............................................. G06F 9/22
[52] U.S. Cl. .................................................. 364/200
[58] Field of Search ... 364/200 MS File, 900 MS File

[56] References Cited

U.S. PATENT DOCUMENTS

| | | |
|---|---|---|
| 3,875,391 | 4/1975 | Shapiro et al. ...................... 364/200 |
| 4,075,688 | 2/1978 | Lynch, Jr. et al. .................. 364/200 |
| 4,110,822 | 8/1978 | Porter et al. ........................ 364/200 |
| 4,498,136 | 2/1985 | Sproul, III .......................... 364/200 |
| 4,638,429 | 1/1987 | Watabe et al. ...................... 364/200 |

Primary Examiner—David L. Clark
Attorney, Agent, or Firm—Antonelli, Terry & Wands

[57] ABSTRACT

An information processing apparatus for executing instructions in parallel includes circuitry which, when a first instruction requesting reading of an operand from a certain address of the main storage or buffer storage has been decoded, detects among instructions in execution the presence of a second instruction requesting writing of an operand held by a register such as a general-purpose register into that address of the main storage without implementing an operation on the operand. If the second instruction has been detected, the invention reads out an operand from the register specified for operand reading by said second instruction before operand writing into the main storage by the second instruction is completed.

8 Claims, 12 Drawing Sheets

| OP | R1 | (X2)+(B2)+D2 | PR(R) | PR(W) |
|----|----|----|----|----|
| ST | 2 | Q | 8 | |
| A | 2 | R | 8 | 9 |
| L | 3 | Q | | 10 |

INFORMATION PROCESSING APPARATUS FOR DETERMINING SEQUENCE OF PARALLEL EXECUTING INSTRUCTIONS IN RESPONSE TO STORAGE REQUIREMENTS THEREOF

BACKGROUND OF THE INVENTION

The present invention relates to an information processing apparatus for executing a plurality of instructions in parallel and, particularly, to an information processing apparatus suitable for executing a plurality of instructions in a parallel in pipeline mode.

In an information processing system intended to speed up the processing by executing a plurality of instructions in parallel (in this specification, term "parallel" includes partial overlap), e.g., a so-called pipeline processing system, if an instruction for reading out an operand (storage operand) in a certain address of the main storage is preceded by an instruction for writing an operand to that address, the state of so-called operand store conflict in which the following read instruction has the same storage operand as that of the preceding write instruction exists, and the following read instruction exists cannot be executed until the preceding write instruction has been completed. This hampers the progress of processing, and the speed-up of the processing by parallel instruction execution cannot be achieved. One of the conventional countermeasures for this problem is to take out the operand of the preceding write instruction during its execution as the operand of the read instruction. For example, United State patent application Ser. No. 627,922 or Japanese Laid-Open Patent Application No. 60-15746 of the same assignee as the present invention discloses a technique of taking out the operand for the read instruction from the work register which holds temporarily the output of the arithmetic unit.

However, the above-mentioned technique requires work registers and its control circuit. Furthermore, in the above technique, the use of the work register is limited to the case in which the read instruction is executed immediately after the preceding write instruction. Therefore, it is desired to speed up the parallel processing for the case of executing another instruction between the preceding write instruction and the following read instruction.

An example of the preceding write instruction used in the above-mentioned patent application is the instruction for reading out an operand from the main storage, implementing the operation for the operand and writing the result into the main storage, as seen in decimal operation instructions. Another example of instructions for writing an operand into the main storage is the store instruction which writes an operand held by general purpose register (register operand) into the main storage without operation. Conventionally, also in the case of this instruction, a register operand is treated to bypass the arithmetical or logical operation unit (ALU) and is written in the main storage.

SUMMARY OF THE INVENTION

It is an object of this invention to provide a simple information processing apparatus which, when a preceding store instruction for writing a register operand into the main storage is in execution, allows the execution of a following instruction for reading out an operand from the same address of the main storage in advance of the completion of operand writing by the store instruction.

Another object of this invention is to provide an information processing apparatus which is suitable for the parallel execution of the above-mentioned following instruction even when another instruction exists between the above-mentioned preceding and following instructions.

In order to achieve the above objectives, the inventive apparatus is capable of, when a first instruction requesting reading of an operand from a certain address of the main storage or buffer storage has been decoded, detecting among instructions in execution the presence of a second instruction requesting writing of an operand held by a register such as a general-purpose register into that address of the main storage without implementing an operation on the operand. If the second instruction has been detected, the present invention reads out the operand from the register specified for operand reading by the second instruction in advance of the completion of operand writing into the main storage by the second instruction.

A particular embodiment of this invention further includes circuitry for detecting between the first and second instructions the presence of a third instruction for writing an operand into a general-purpose register specified by the second instruction, and invalidates the result of detection of the second instruction if the third instruction is detected. This enables the reading of the register operand for the first instruction before completion of operand writing by the second instruction even if another instruction exists between the first and second instructions.

DESCRIPTION OF THE PREFERRED EMBODIMENTS

The present invention applied to the apparatus of a pipeline processing system will be described in the following. The basic architecture of the apparatus is derived from the M-series computer system manufactured by Hitachi Ltd., Japan, for illustrative purposes.

Figure 1:
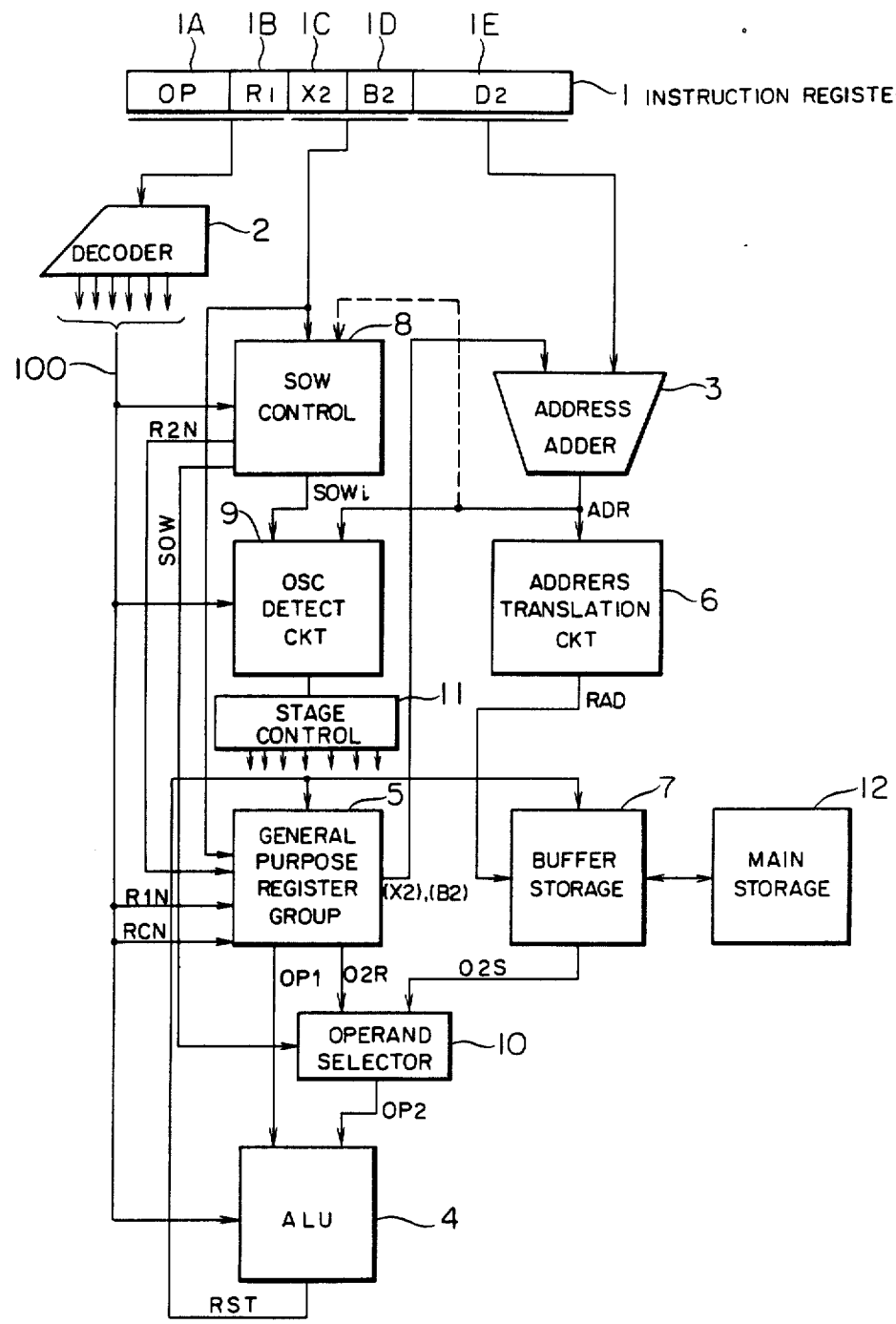
FIG. 1 is a block diagram showing in brief the general arrangement of an embodiment of this invention.

FIG. 1 is a brief block diagram showing the overall structure of the processing apparatus embodying the present invention. An instruction register 1 holds an instruction to be executed. An instruction decoder 2 decodes the instruction held in the instruction register 1 and provides control signals 100 to respective parts of the apparatus. A general-purpose register group 5 consisting of a group of registers is used mainly to hold frequently-used data. A buffer storage 7 is a fast-operating storage unit holding a partial copy of the contents of a main storage 12. An address adder 3 calculates the storage addresses for the operand read out fo the main storage and the operational result stored in the main storage. An address translation circuit 6 translates the logical address calculated by the address adder 3 into the corresponding physical address for making access to the buffer storage 7. An arithmetical or logic unit (ALU) 4 performs the operation specified by the instruction for the operand read out of the general-purpose register 5 and/or buffer storage 7, and writes the operational result in the general-purpose register 5 or buffer storage 7. A stage control circuit 11 is a circuit for controlling the timing of set signals to various registers so that instruction processing is divided into several processing stages for the execution in a pipeline manner. The main storage is a bulk storage in which all data to be processed are stored. However, at the actual execution of an instruction, necessary data are already transferred to the buffer storage 7, and the storage access is mostly made to the buffer storage 7. The following description does not consider the distinction between the main storage 12 and the buffer storage 7.

The following describes the classification of instructions used in this embodiment.

W-type instructions: Instructions which request writing of the operational results into the main storage.

S-type instructions: Instructions which request reading of operands from the general-purpose register group 5 and writing of the operands unchanged into the main storage 12 without operation. The aforementioned store instruction is this type of instruction.

F-type instructions: Instructions which request reading of operands out of the main storage 12.

C-type instruction: Instructions which request writing of the operational results into the general-purpose register group 5.

S-type instructions are at the same time W-type. Instructions which read operands out of the main storage 12 and write the operands unchanged or operated into the main storage 12 are F-type instructions and at the same time W-type instructions. Such instructions have a format categorized to be SS-type different from the instruction format shown in FIG. 1 (called RX-type). Instructions which read operands out of the main storage 12 and write the operands unchanged or operated into the general-purpose register group 5 are F-type instructions and at the same time C-type instructions. Instructions which read operands out of the general-purpose register and, after operation, write the operatinal results into the general-purpose register are C-type instructions, but are not F-type instructions. Such instructions have a format of RR-type different from the instruction format shown in FIG. 1.

Although the apparatus embodying the present invention is capable of executing instructions of RX-type, SS-type and RR-type, the following description is devoted to the operation of the RX-type instructions for the sake of simplicity.

An example of F-type or S-type instructions is shown in the instruction register 1 in FIG. 1. The instruction register 1 has an OP section 1A specifying the type of operation, R1, X2 and B2 sections 1B-1D each designating a general-purpose register in the general-purpose register group 5, and a D2 section 1E specifying the displacement for determining the storage address. The D2 section 1E has its content added by the address adder 3 to the contents of a general-purpose register designated by the X2 and B2 sections 1C and 1D (the register contents will be expressed as (X2 and (B2) hereinafter) so as to produce the logical address ADR. An instruction having the instruction format of this type generally has a first operand that is the general-purpose register content (R1) specified by the R1 section 1B and a second operand that is the main storage content specified the logical address ADR, implements the operation specified for these two operands by the OP section 1A, and dictates to write the operational result in a general-purpose register designated by the R1 section 1B. Accordingly, the instruction in this case is F-type and at the same time C-type. In the case of a load instruction, the content of the main storage 12 addressed by the logical address ADR is written unchanged into a general-purpose register designated by the R1 section 1B. Accordingly, the instruction is F-type and at the same time C-type also in this case. In the case of a store instruction, the general-purpose register content (R1) specified by the R1 section 1B is written unchanged into the main storage 12 addressed by the logical address ADR. Accordingly, the instruction of this case is S-type.

Figure 2:
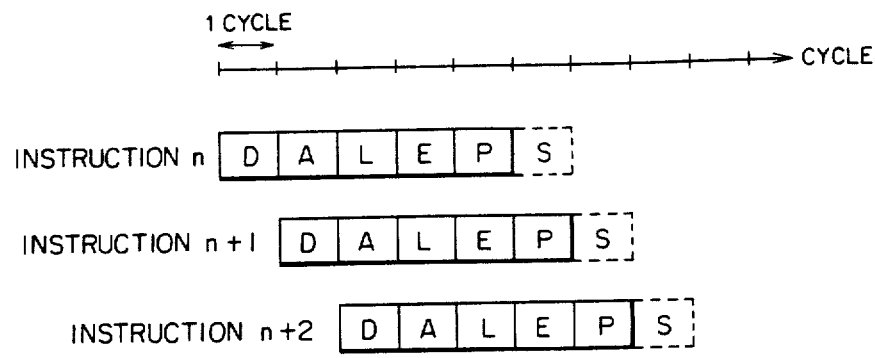
FIG. 2 is a general timing chart of the pipeline processing by the apparatus shown in FIG. 1.

FIG. 2 shows the typical flow of instruction process in pipeline processing system. The instruction process is carried out by being divided into a plurality of process stages, and each process stage is applied continuously to a plurality of consecutive instructions so that all process stages operate in parallel to reduce the processing time as a whole. The processing time of each process stage is called a "cycle", which defines the unit of processing time. The process of one instruction proceeds in stages of D, A, L, E and P in each cycle. In the case of a W-type (including S-type) instruction, an S stage is added after the P stage. In the D stage, instruction decoding by the instruction decoder 2 and address calculation by the address adder 3 take place, and in the A stage, address translation by the address translation circuit 6 takes place. In the L stage, operand reading from the buffer register 7 and/or general-purpose register 5 takes place, in the E stage, operation execution takes place, and in the P stage, writing of the operational result in the general-purpose register takes place in the case of a C-type instruction. In the case of a W-type instruction, writing of the operational result into the buffer register 7 takes place in the P and S stages.

Figure 3:
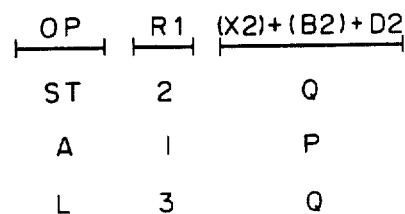
FIG. 3 is a model diagram showing an example of an instruction string.

FIG. 3 shows an example of the instruction string in which the present invention exerts its effects. The first instruction ST is an example of store instructions, writing the content of the second of the general-purpose register group 5 (will be termed simply GR2 hereinafter) into the buffer storage 7 at address Q (Q has a value of (X2)+(B2)+D2 for the ST instruction). The second instruction A is an example of add instructions, adding the content of GR1 to the content of the buffer storage 7 at address P (P has a value of (X2)+(B2)+D2 for the A instruction) and writing the result in GR2. The third instruction L is an example of load instructions, reading the content of the buffer storage 7 at the above-mentioned address Q and writing it in GR3.

Figure 4:
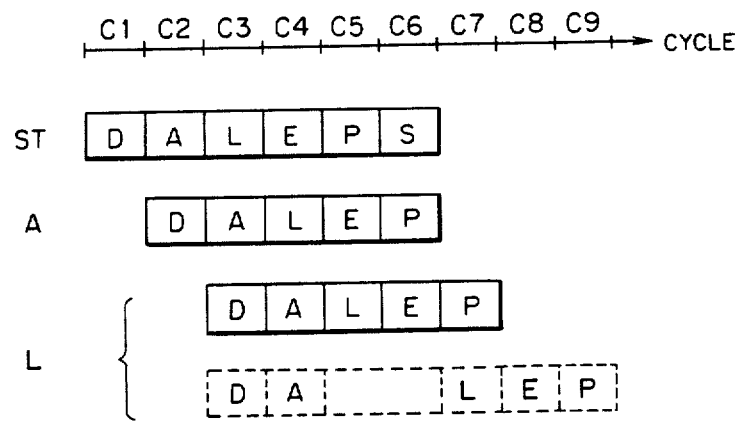
FIG. 4 is a timing chart of the processing for the instruction string shown in FIG. 3.

FIG. 4 is a brief timing chart for the execution of the instruction string in FIG. 3 by the apparatus shown in FIG. 1. The time axis has a scale in cycles, with names C1, C2, C3 and so on being given to the consecutive cycles beginning with the initial cycle (left end in the figure).

The D stage of the ST instruction is executed in C1. When the sequence enters C2, the ST instruction proceeds to the A stage, and the D stage of the subsquent A instruction begins. In C3, the ST and A instructions proceeds to the L and A stages, respectively, and the D stage of the L instruction begins. In this way, the processes for the three instructions go on in parallel.

Since the operand to be read from the buffer storage 7 by the L instruction is written into the buffer storage 7 by the ST instruction, it is settled in the buffer storage 7 at C6. Therefore, if it is intended to read the operand of the L instruction out of the buffer storage 7 in accordance with the conventional manner, it can be done at C7 or later. On this account, unsettlement of the operand in the buffer storage 7 causes the occurrence of a wait state when a conventional technique is used. This event is called "operand store conflict" (may be termed simply OSC hereinafter). According to the present invention, the content of the general-purpose register (GR2) specified by the ST instruction is read out without waiting for the writing of the operand into the buffer storage 7 by the ST instruction through the functioning of the SOW control circuit 8, OSC control circuit 9 and operand selector 10. This allows the E stage of the L instruction to begin at C6. In this case, the A instruction does not rewrite the general-purpose register GR2, and the same operand as that written by the ST instruction into the buffer storage 7 can be read out of the general-purpose register GR2. If the A instruction is an instruction that rewrites the general-purpose register GR2, the L stage of the L instruction will begin at C7 after the ST instruction has written the operand into the buffer storage 7 as in the conventional way as shown by the dashed line in FIG. 4, and in this case the operand is read out from the buffer storage 7. The operand selector 10 shown in FIG. 1 operates to select an operand read out of the general-purpose register group 5 or buffer storage 12 and deliver it to the arithmetical or logical operation unit (ALU) 4. The SOW control circuit 8 operates to control the operation of the operand selector 10 by detecting, upon decoding of an F-type instruction such as A or L instruction, the earlier presence of the S-type instruction which has written the operand into the same storage address. The OSC detection circuit in FIG. 1 operates to detect "operand store conflict", and this circuit will be explained in detail later.

In case, in FIG. 4, the L instruction has been decoded following the ST instruction, the E stage of the L instruction begins at C5, and therefore the L instruction can complete three cycles earlier than the conventional operating manner.

Figure 5A:
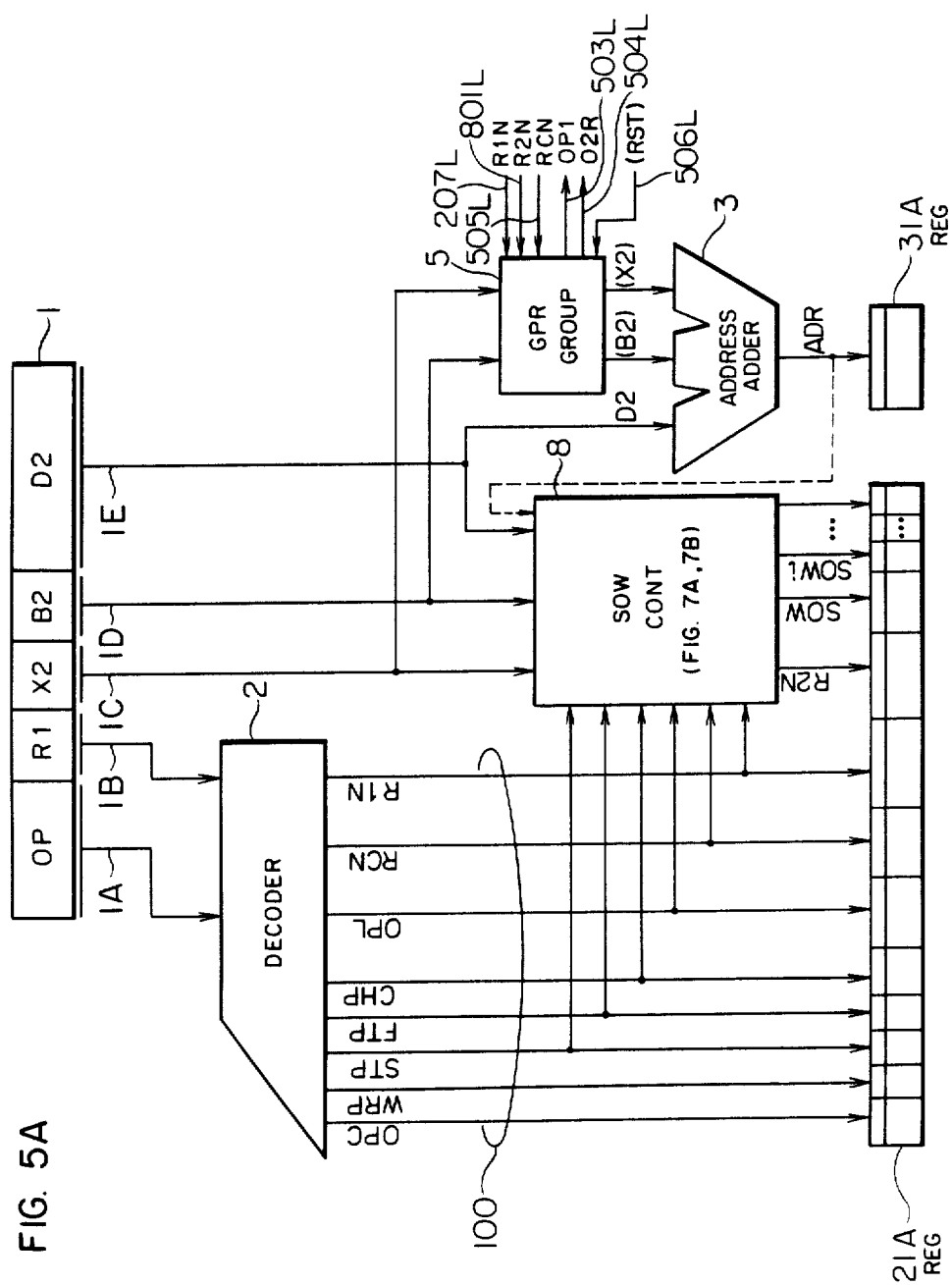
FIGS. 5A and 5B are block diagrams showing in combination in more detail the apparatus of FIG. 1.
Figure 5B:
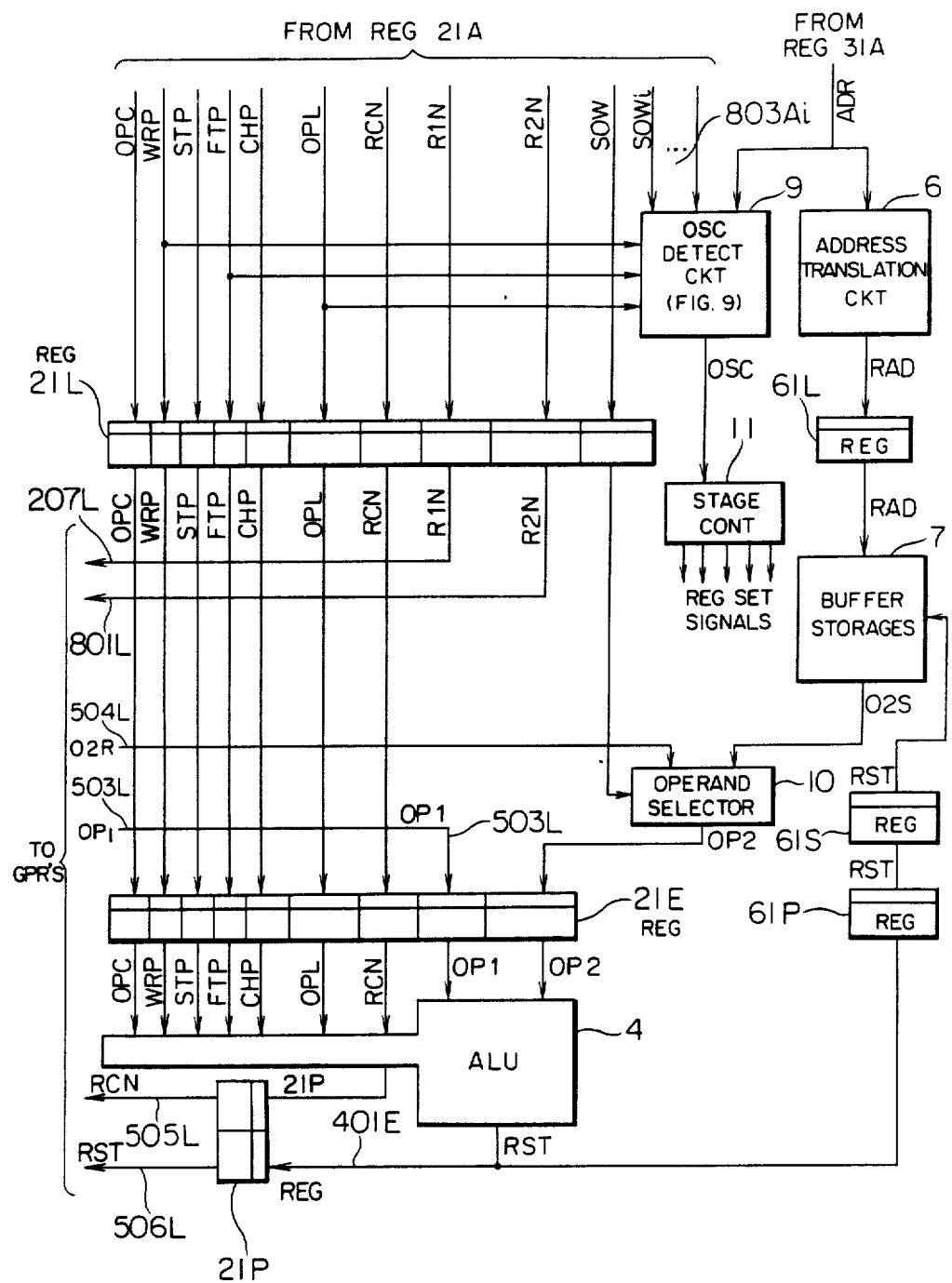

FIGS. 5A and 5B are block diagrams showing in combination the details of the processing apparatus shown in FIG. 1.

An instruction to be executed is sent through the known circuit arrangement (not shown) to the instruction register 1 and held in it. The instruction decoder 2 decodes the instruction held in the instruction register 1 to produce various control signals 100 and sends the signals to the respective sections of the apparatus. Among these signals the following signals pertain to the explanation of this embodiment.

OPC: A control signal corresponding to the OP section 1A of an instruction, specifying the type of operation to be implemented by the arithmetical or logical operation unit (ALU) 4.

WTP: A signal indicating that the instruction is W-type.

STP: A signal indicating that the instruction is S-type.

FIP: A signal indicating that the instruction is F-type.

CHP: A signal indicating that the instruction is C-type.

OPL: A signal indicating the length of the operand determined by the OP section 1A of the instruction.

RCN: A signal specifying the number of the general-purpose register 5 in which the operational result is written.

R1N: A signal specifying the number of the general-purpose register 5 from which the first operand is read out.

The general-purpose register 5 is a group of registers, and works to deliver the register contents (B2) and (X2) as specified by B2 and X2 sections 1C and 1D to the address adder 3. The address adder 3 operates to add the contents of the base register (B2) and index register (X2) to the displacement D2, and produces the logical operand address ADR. The ADR specifies the storage address for storing the operational result for W-type instructions, and specifies the storage address for reading out the second operand for F-type instructions.

The SOW control circuit 8 tests in the early processing stage (D stage) as to whether the storage area written by the preceding S-type instruction (e.g., ST instruction in FIG. 3) includes the whole storage area read by the following F-type instruction by using the address information given by the instruction, such as the base register number, index register number, displacement, and operand length. At this time, it is also tested as to whether the content of the general-purpose register 5 from which the operand is read out by the S-type instruction is changed by an instruction (e.g., A instruction in FIG. 3) after the S-type instruction, and if it is found unchanged, the circuit operates on the F-type instruction in execution to read out its operand directly from the general-purpose register 5 instead of the buffer register 7 (this control is called "storage operand wraparound"). Namely, the circuit 8 produces the SOW signal dictating storage operand wraparound and, at the same time, outputs the general-purpose register number R2N specified by the preceding S-type instruction as a number of the general-purpose register 5 to be read by the F-type instruction. The circuit 8 also provides the signals SOWi (i=1 to n) which suppress the operand store conflict detected by the OSC detection circuit which will be explained later. The SOW control circuit 8 including its circuit arrangement will be described in detail later.

The D stage of the instruction has now completed, and the outputs of the instruction decoder 2 and SOW control circuit 8 are set in the register 21A and the output ADR of the address adder 3 is set in the register 31A at the beginning of the A stage of the instruction. The set signal for these registers is issued by the stage control circuit 11.

The address translation circuit 6 receives via the register 31A the logical address ADR produced by the address adder 3, and translates it into the physical address RAD.

The OSC detection circuit 9 is the same circuit as used in the conventional system for detecting operand store conflict between the preceding W-type (including S-type instruction and the following F-type instruction using the logical address ADR received from the address added 3 via the register 31A. However, when the SOW control circuit 8 outputs the OSC suppression signal SOWi (i=1 to n), the detection of operand store conflict is suppressed. If at least one instruction without suppression of operand store conflict exists out of the preceding W-type instructions in which operand store conflict has been detected, the OSC detection circuit 9 sends the OSC detect signal OSC to the stage control circuit 11. The OSC detection circuit 9, which will be described in detail later, detects the overlap of the storage area written by the preceding W-type instruction with the storage area read by the following F-type instruction, and indicates to the stage control circuit 11 that the L stage of the following F-type instruction be executed after operand writing by the preceding S-type instruction has completed.

FIGS. 6A to 6D show the overlap of the storage areas for a W-type (including S-type) instruction and an F-type instruction. In any of FIGS. 6A to 6D, operand store conflict occurs, and it is detected by the OSC detection circuit 9. The SOW control circuit 8 dictates to take storage operand wraparound in the case of FIG. 6A, and operand storage conflict detected by the OSC detection circuit 9 is suppressed. This operation will be described in further detail in connection with the OSC detection circuit 9.

The A stage of the instruction is now completed. If the OSC signal is not provided by the OSC detection circuit 9, the stage control circuit 11 issues the set signal to the registers 21L and 61L at completion of the A stage. Consequently, signals OPC, WRP, STP, FTP, CHP, OPL, RCN, R1N, R2N, and SOW are set in the register 21L, while the physical address RAD from the address translation circuit 6 is set in the register 61L. Then, the L stage of the instruction begins. On the other hand, while the OSC signal is outputted, these register-set signals are not produced, and the L stage does not begin.

Figure 6A:
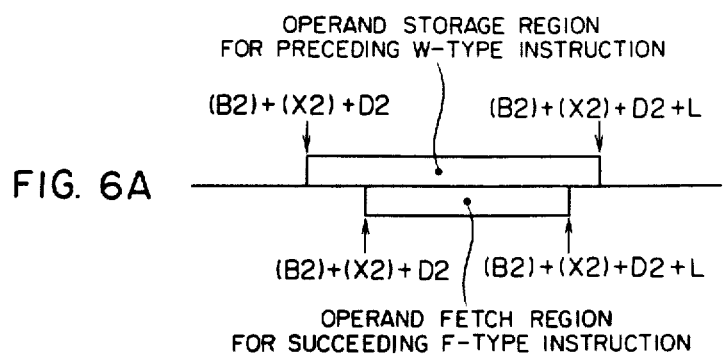
FIGS. 6A to 6D are diagrams showing different froms of overlapping memory areas for operands of two instructions.
Figure 6B:
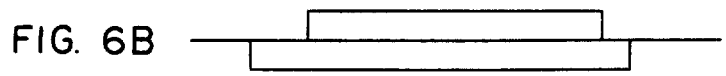
Figure 6C:
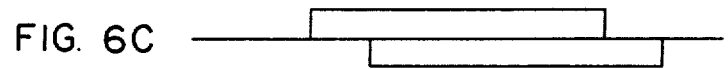
Figure 6D:
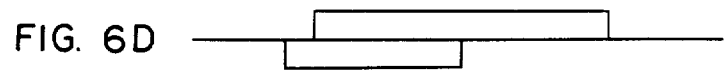

As can be seen from the above description, the L stage begins upon completion of the A stage in the case of FIG. 6A, but it does not begin until the operand for the preceding W-type instruction has been written in the case of FIGS. 6B to 6D.

In the L stage, in general, the register number R1N which has been set in the register 21L is sent over the line 207L to the general-purpose register group 5, and the first operand OP1 is read out on the line 504L and delivered to the register 21E. The physical address RAD in the register 61L is fed to the buffer storage 7, and the second operand 02S is read out of it and delivered to the operand selector 10.

The operand selector 10 normally selects the operand 02S from the buffer storage 7. The selected operand is sent as the second operand OP2 to the register 21E. In the case of an F-type instruction, operand 02R is read out of the general-purpose register 5 in accordance with the register number R2N of the preceding S-type instruction provided by the register 21L. If the SOW signal provided by the SOW control circuit 8 exists in the register 21L, the operand selector 10 selects the operand 02R from the general-purpose register 5. In the case of an S-type instruction (store instruction), the second operand OP2 provided by the operand selector 10 is not used.

The stage control circuit 11 supplies the set signal to the register 21E in the next of the cycle in which the set signal is provided for the registers 21L and 61L. Then the signals OPL, WRP, STP, FTP, CHP, OPL, and RCN given by the register 21L, the first operand OP1 read out of the general-purpose register 5 and the second operand OP2 provided by the operand selector 10 are set in the register 21E, and the E stage begins.

The arithmetical or logical operation unit (ALU) 4 normally performs the operation specified by the OPC signal for the first operand OP1 and the second operand OP2. In case of an S-type instruction, however, the ALU 4 outputs the first operand from the general-purpose register 5 without operation, and in case of the load instruction which is one of the F-type instructions, the ALU 4 outputs the second operand from the buffer storage 7 without operation. Upon completion of the E stage, the operational result RST is set in the registers 21P and 61P, and the P stage begins.

In the case of a C-type instruction, the operational result RST which has been set in the register 21P is sent together with the writing register number RCN to the general-purpose register group 5 and set in it. In the case of a W-type instruction, the operational result RST which has been set in the register 61P is sent via the register 61S and set in the buffer storage 7 in the subsequent S stage.

As can be seen from the above description, when the SOW control circuit 8 has detected an F-type instruction of the case of FIG. 6A, the operand needed for the L stage can be read out from the general-purpose register by making reference to the general-purpose register number R2N read by the preceding S-type instruction.

Figure 7A:
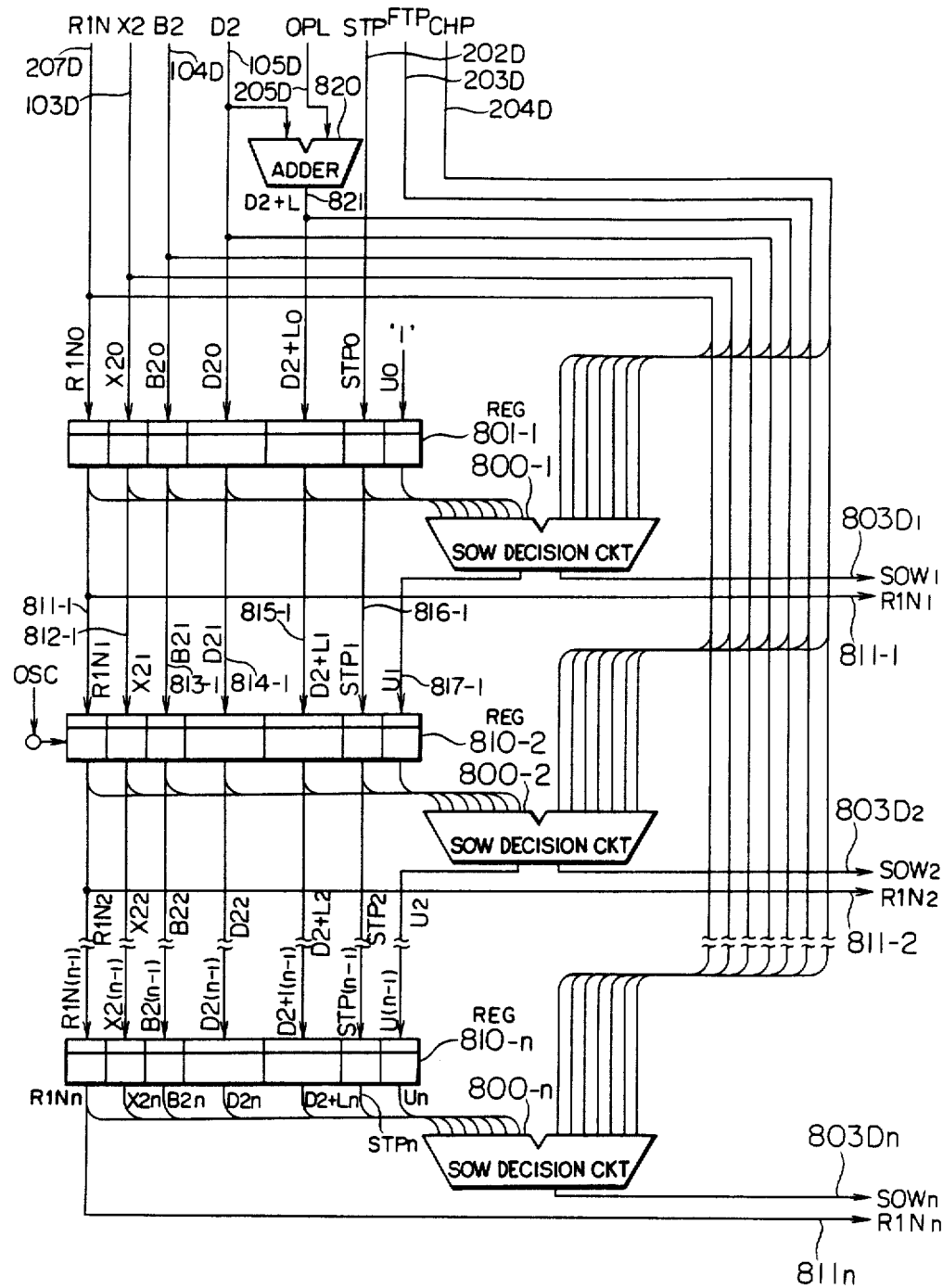
FIGS. 7A and 7B are block diagrams showing in combination the SOW control circuit in the apparatus shown in FIG. 1.
Figure 7B:
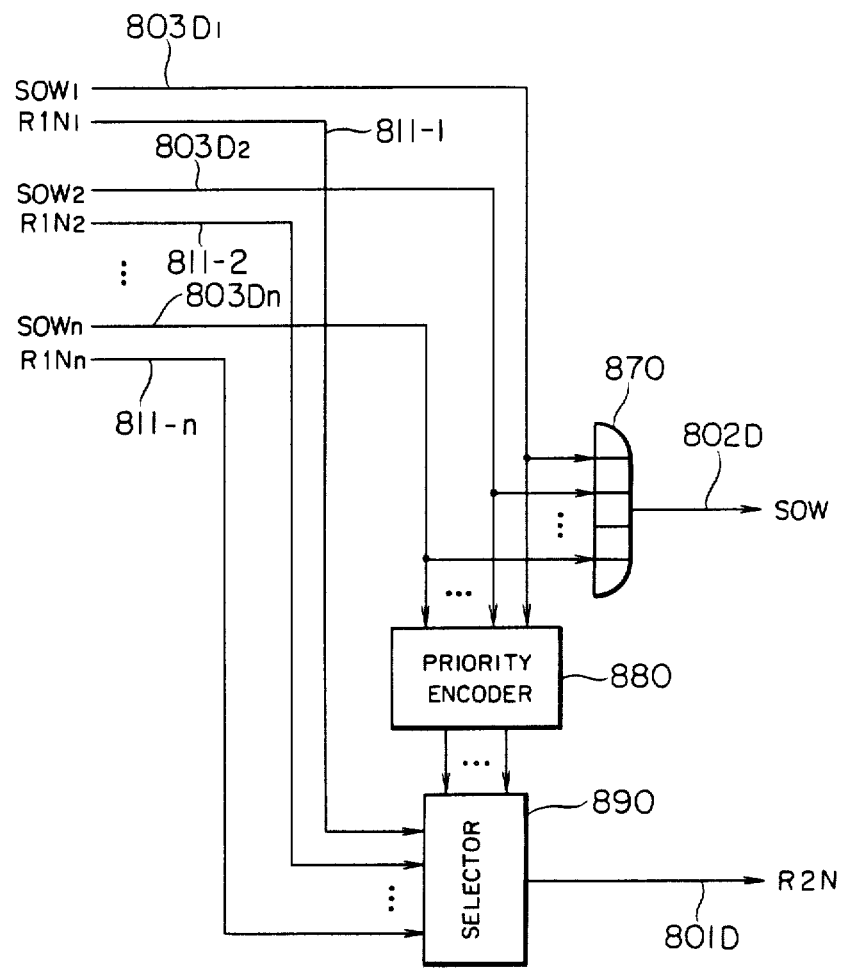

FIGS. 7A and 7B in combination show an example of the arrangement of the SOW control circuit 8 shown in FIG. 5A. The SOW control circuit 8 includes SOW decision circuits 800-i (i=1 to n) for testing as to whether storage operand wraparound can take place for the operand store conflict occurring between the instruction which is being decoded at that time point and the instruction in execution which precedes the above instruction by i steps of instructions, and registers 810-i (i=1 to n) connected in series for holding decoded information for the instructions in correspondence to the SOW decision circuits 800-i. Decoded information for the instruction set in the instruction register 1 and decoded by the instruction decoder 2 is set in the register 810-1 in synchronism with the timing of the A stage. With the advancement of stages of the instruction, its decoded information is set in the registers 810-1, 810-2, ..., and 810-n sequentially. Accordingly, each register 810-i (i=1 to n) holds the decoded information for the instruction in execution preceding the instruction which is being decoded at that time point by i steps of instructions.

Decoded information set in the registers 810-i includes the register number R1N for the first operand, address information X2, B2, D2 and D2+L for the second operand, and the STP signal indicating the instruction to be S-type. The D2+L is the last digit of the displacement of the second operand, and it is produced as a sum of the displacement D2 and the operand length OPL by the adder 280. The registers 810-i have an additional U bit. A register 810-i with its U bit being set indicates that no instructions rewriting general-purpose registers with register numbers R1N, X2 and B2 exist after the instruction corresponding to the register 810-i. A SOW decision circuit 800-i in connection with a register 810-i having its U bit being reset always dictates that storage operand wraparound cannot take place.

As will be described in detail later, the SOW control circuit 8 detects the case of FIG. 6A by comparing the register numbers X2 and B2 specified by the following F-type instruction with the register numbers X2 and B2 specified by the preceding S-type instruction, on the premise that between the preceding S-type instruction and the following F-type instruction there is no instruction rewriting registers with register numbers X2 and B2 specified by the preceding instruction. On this account, if the content of a general-purpose register specified by X2 or B2 is changed by an instruction between the preceding S-type instructin and the following F-type instruction, the meaning of comparing X2 and B2 is lost. In addition, if the content of a general-purpose register specified by R1N is changed, the instruction execution in which the operand in the R1N register is used in place of the operand written in the buffer storage 7 by the preceding S-type instruction will result in error.

Figure 8:
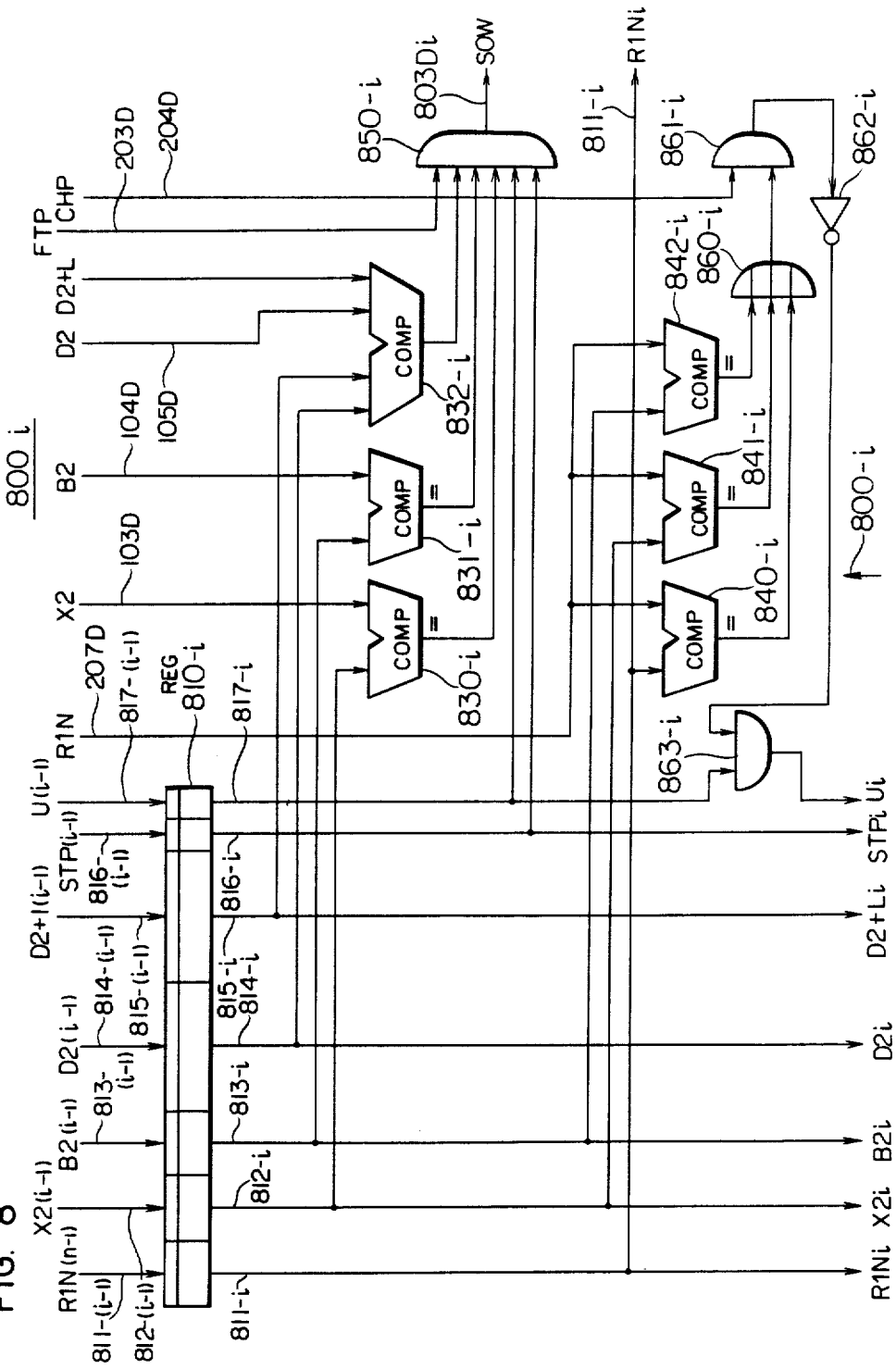
FIG. 8 is a block diagram of the SOW decision circuit used in the circuit shown in FIG. 7.

FIG. 8 shows the internal arrangement of the SOW decision circuit 800-i and also shows the register 810-i. The SOW decision circuit 800-i tests as to whether storage operand wraparound can take place for the operand store conflict occurring between the instruction in decoding process at that time point and the instruction which precedes the current instruction by i steps of instructions, and the register 810-i holds decoded information for the preceding instruction, as have been described previously. In the following description, the decoded information for the instruction in decoding process in that time point will be expressed by the symbol without suffix, while the decoded information for the instruction preceding the current instruction by i steps of instructions will be expressed by the symbol with suffix "i". For example, the base register number for both instructions are expressed as B2 and B2i.

The condition of implementing storage operand wraparound for the operand storage conflict occurring between the instruction in decoding process at that time point and the instruction preceding that instruction by i steps of instructions is as follows.

(1) The instruction in decoding process is an F-type instruction.

(2) The preceding instruction is an S-type instruction.

(3) The storage area for the F-type instruction is included in the storage area of the S-type instruction.

(4) The condtent of a register read out by the S-type instruction has not yet been changed.

The condition (3) uses address information specified by the instruction, such as the index register number, base register number, displacement, operand length, etc., instead of using the operand address after address calculation, and therefore the sufficient condition for the condition (3) to hold is as follows.

(3.1) The F-type instruction and the S-type instruction have an equal index register number.

(3.2) The F-type instruction and the S-type instruction have an equal base register number.

(3.) The F-type instruction has its storage area. which is based on the operand length and displacement, included in that of the S-type instruction (see FIG. 6A).

(3.4) The S-type instruction has its base register content and index register content unchanged.

The conditions (1) and (2) signify FTP="1" and STPi="1", respectively. The subconditions (3.1) and (3.2 ) signify X2=X2i and B2=B2i, respectively, and they are tested by the comparators 830-i and 831-i. The subcondition (3.3) signifies $D2 \geq D2i$ and at the same time $D2+L \leq D2+Li$, and it is tested by the comparator 832i. The condition (4) and subcondition (3.4) both signify Ui="1". These conditions are assembled on the inputs of the AND gate 850-i, which by being enabled produces the SOWi signal indicating that storage operand wraparound is possible. The circuit 800i also outputs the register number read out by the preceding S-type instruction as the R1Ni signal.

Next, the control for the U bit added to the register 810-i will be described. When an instruction is decoded and held in the register 810-1, the U bit is set to "1". Thereafter, the U bit is reset to "0" when change is made in the content of a register indicated by register number R1Ni and X2i and B2i. The condition for the reset of the U bit is as follows.

(1) The instruction in decoding process is a C-type instruction.

(2) The register written by the C-type instruction has a register number equal to that set in the register 810-i.

The condition (1) signifies CHP="1", and the condition (2) signifies R1N=R1Ni, R1N=X2i or R1N=B2i. The fulfillment of these conditions are tested by the respective comparators 840-i, 841-i, and 842-i, and at least one of the comparators detecting the coincidence causes the OR gate 860-i to output "1". The AND gate 861-i receives the results of the conditions (1) and (2), and upon fulfillment of both conditions it provides the output through the inverter 862-i and AND gate 863-i to reset the U bit.

Returning to FIGS. 7A and 7B, the SOW decision circuits 800-i provide the SOW decision signals SOWi and the first operand register numbers R1Ni for the operand store conflicts occurring between the instruction in decoding process at that time point and the instruction preceding that instruction by i steps of instructions. The SOWi signals also work as the suppression signal of operand store conflict detected by the OSC detection circuit 9. If at least one SOW decision signal SOWi is produced, the OR gate 870 outputs the SOW signal dictating storage operand wraparound. The SOW decision signals SOWi are encoded by the priority encoder 880 and received by the selector 890, which then selects a first operand register number R1Ni of the instruction nearest to the instruction in decoding process at that time point amount the instructions with the occurrence of operand store conflict which have been made the SOW decision, and outputs it as a register number R2N to be rendered storage operand wraparound.

Figure 9:
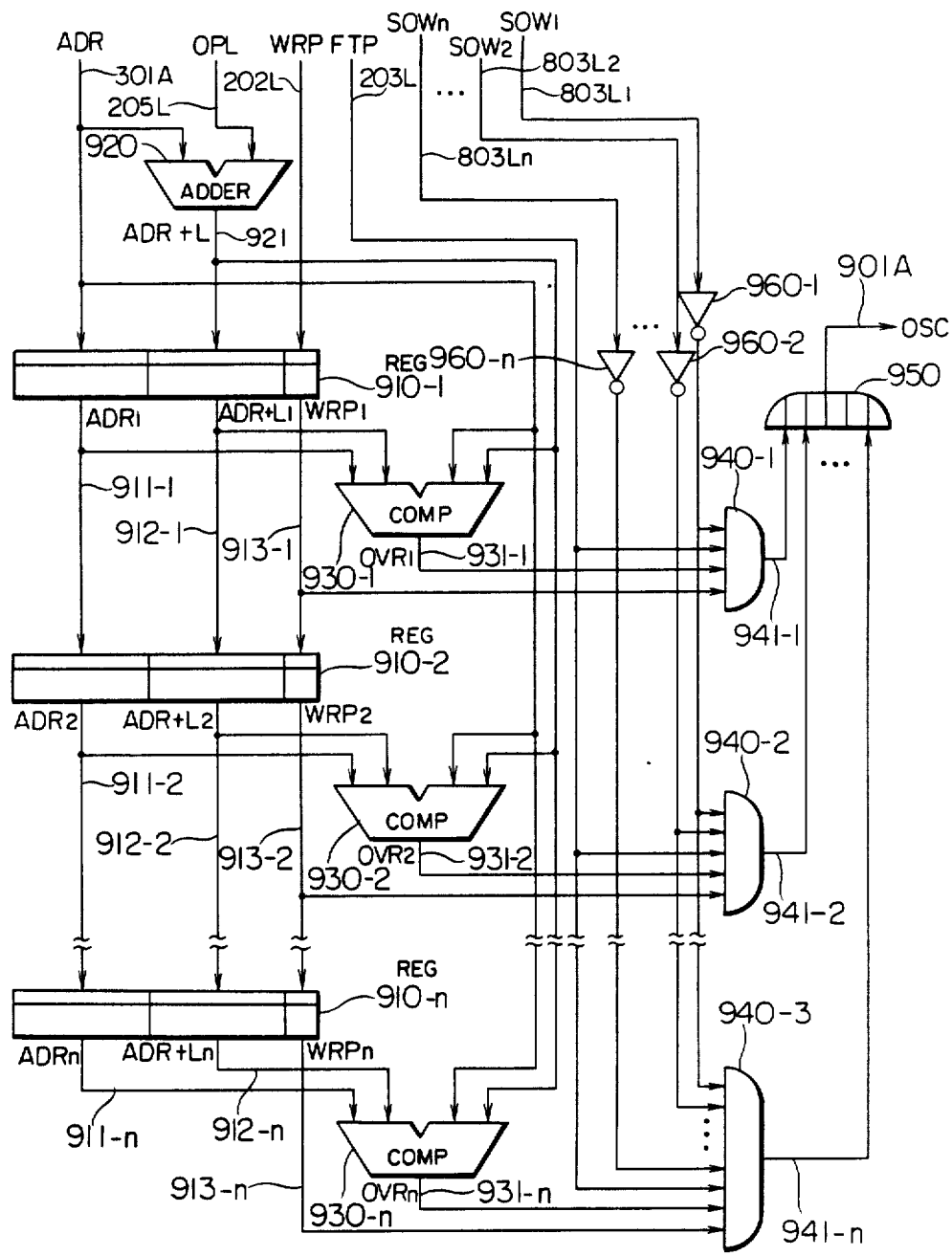
FIG. 9 is a block daigram of the OSC detection circuit in the apparatus shown in FIG. 1.

FIG. 9 shows an example of the arrangement for the OSC detection circuit 9 shown in FIG. 5B. The OSC detection circuit 9 receives the storage address ADR provided by the address adder 3, the decoded information sent from the instruction decoder 2, and the OSC suppression signal (same as SOW decision signal) produced by the SOW control circuit 8. The operand address ADR and operand length OPL are received by the adder 920, which provides the result ADR+L. The ADR and ADR+L indicate the top and end of the storage area for the operand. The ADR, ADR+L and WRP signal indicating the instruction to be of W-type are set in the register 910-1 at the timing of the L stage. As the instruction stage progresses, the information is set in the registers 910-1, 910-2, . . . , and 910-n sequentially. Accordingly, the registers 910-i (i=1 to n) hold the information for the instruction in execution which precedes the instruction generating the information fed to the OSC detection circuit 9 at that time point by i steps of instructions.

The condition of the occurrence of operand store conflict between the instruction generating the information to the OSC detection circuit 9 at that time point and the instruction preceding that instruction by i steps of instructions is as follows.

(1) The instruction generating the input information is an F-type instruction.

(2) The preceding instruction is a W-type instruction.

(3) The operand storage area for the F-type instruction and the operand storage area for the W-type instruction are overlapped.

The condition (3) is tested by the comparator 931-i which receives ADR and ADR+L representing the operand storage area for the F-type instruction and ADRi and ADR+Li representing the operand storage area for the W-type instruction (four cases of FIGS. 6A to 6D). The comparators 930-i produce the overlap detect signals OVRi when ADR≦ADR+Li and ADRi≦ADR+L are met. Accordingly, the fulfillment of the above conditions are indicated by FTP="1" for (1), STPi="1" for (2) and OVRi="1" for (3), and these results of conditions are received by the AND gates 940-i.

The AND gates 940-i recieve the OSC suppression signals for all instructions ranging from the instruction generating the input information to the instruction preceding that instruction by i steps of instructions, so that the detection of operand store conflict is suppressed when storage operand wraparound takes place. The outputs of the AND gates 940-i are received by the OR gate 950, which produces the OSC detect signal OSC when at least one AND gate 940-i has detected the occurrence of operand store conflict, and it is delivered to the stage control circuit 11.

In the embodiment of FIG. 1, if the SOW control circuit 8 performs address comparison using address information instead of the address itself, the SOW control signal can advantageously be obtained at the early stage (D stage). As a modified example, however, the SOW control circuit 8 may use the address itself for implementing address comparison. Although in this case, acquisition of the SOW control signal needs a longer time since the step of calculating the address is indispensable, it has the advantage of enabling SOW decision even if change is made in the content of a register specified by the base register number and index register number used as the address information. For realizing this embodiment, the address ADR is sent from the address adder 3 to the SOW control circuit 8 through the path shown by the dashed line in FIG. 1 and FIG. 5A. In addition, in FIG. 7A and FIG. 8, the portions pertaining to the signals X2 and B2 are left untouched, and the portion pertaining to the signal D2 is replaced with the signal ADR.

Next, the second embodiment of this invention will be described. For an apparatus capable of concurrent execution of a plurality of instructions using a plurality of ALUs, there has been proposed a method of dynamically assigning physical registers to the instructions (will be termed "virtual register system" hereinafter), as disclosed in United States patent application Ser. No. 682,839, now U.S. Pat. No. 4,736,288, issued Apr. 5, 1988, which is incorporated herein by reference. The virtual register system allows, even in the case where the same logical register is specified repeatedly in a plurality of instructions executed concurrently, the assignment of a different physical register at each time to that logical register, preventing the disability of reading out the operand from the F-type instruction due to change in the register content by an intermediate instruction, whereby the present invention is expected to have more significant effects of fostering the parallel instruction execution.

Figures 10, 11:
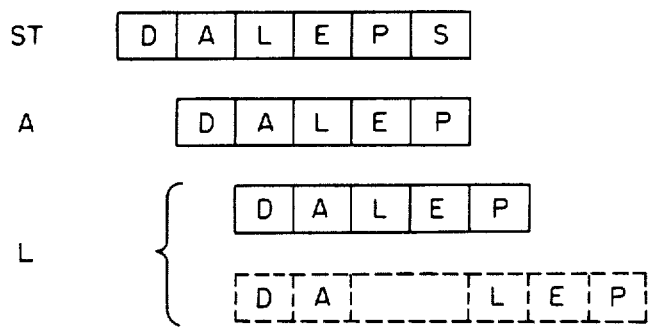
FIG. 10 is a model diagram showing an example of the instruction string used in the second embodiment of this invention based on the concept of virtual register.
FIG. 11 is a timing chart of the processing for the instruction string shown in FIG. 10.

FIG. 10 shows an example of the instruction strings in which the present invention of virtual register system exerts its effect. In FIG. 10, PR (R) is the physical register number assigned for reading out the operand. The field of PR(W) indicates the physical register number assigned for writing the operational result in instruction execution. The first instruction ST is to store the content of the physical register (i.e., with physical register number 8 in this example, will be termed simply PR8 hereinafter) in correspondence to the logical register with register number 2 (will be termed simply LR2 hereinafter) in the buffer storage at address Q. The second instruction A is to add the content of the buffer storage at address R to the content of PR8 corresponding to LR2 and write the operational result in PR9 which has been newly made correspondence to LR2. The third instruction L is to read out the content of the buffer storage at address Q into PR10 which has been newly made correspondence to LR3.

FIG. 11 shows briefly the timing chart for the execution of the instruction string shown in FIG. 10 by the inventive apparatus of virtual register system. Instruction A begins the D stage at the C2 cycle and begins the E stage at C5. Instruction L begins the D stage at C3. The operand to be read out from the buffer storage by the L instruction is written in it by the preceding ST instruction, and accordingly the operand settles in the buffer storage at C6. Therefore, according to the conventional technique, the L instruction can read the operand in the buffer storage at C7 or later. The general-purpose register which has been holding the operand to be read out by the ST instruction is rewritten in a logical sense by the A instruction. Whereas according to the present invention, the E stage of the L instruction can be executed without waiting for the operand written in the buffer storage by the ST instruction even if the general-purpose register holding the operand to be read out by the ST instruction is rewritten in a logical sense by the A instruction between the ST and L instructions. The reason is that the operand to be read out by the ST instruction is reserved in physical register PR8 and it is not rewritten by the A instruction.

Figure 12:
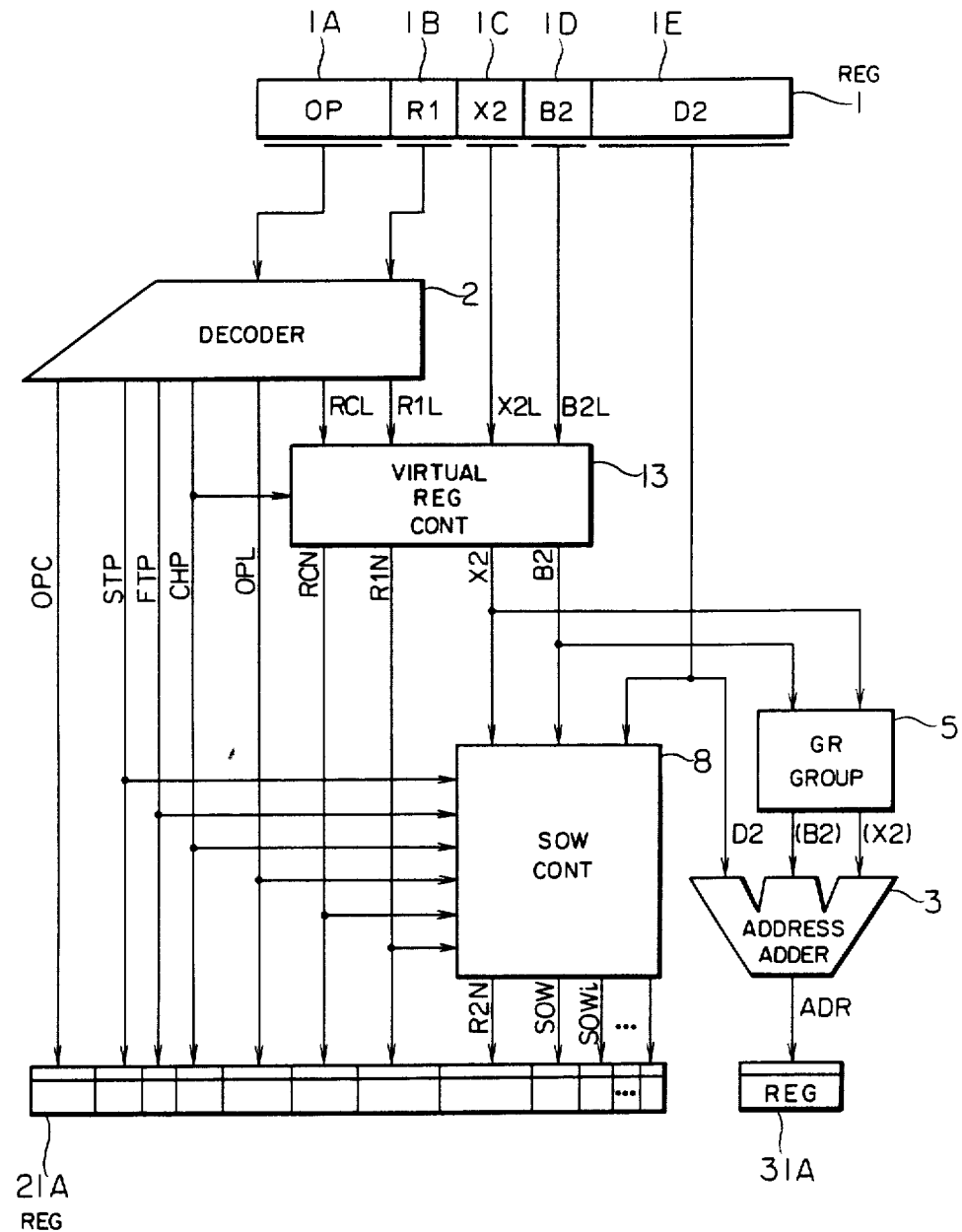
FIG. 12 is a block diagram showing the general arrangement of the second embodiment of this invention.

Next, the arrangement of the inventive apparatus employing virtual register system will be described. The overall arrangement of the apparatus is shown in FIG. 12 which originates from FIG. 5A, but further incorporates a virtual register control circuit 13.

In virtual register system, registers specified logically by the instruction, i.e., the instruction register 1 and registers specified in register numbers B2L, X2L, R1L and R1L provided by the instruction decoder 2 are called logical registers. Registers existing physically for actually holding data are called physical registers.

The virtual register control circuit 13 operates to convert the logical register number into the physical register number and assign a new physical register for a logical register which has undergone writing. The control functions of virtual register system is described in detail in the previously mentioned United State patent application Ser. No. 682,839, 364/736 and since it is not objective of this invention by itself, only necessary matters thereof will be explained in the following.

The virtual register control circuit 13 has a means for converting the logical register number into the physical register number through the provision of a translation table which holds the physical register number assigned to the logical register at that time point, for example. By the function of this translation means, logical register numbers B2L, X2L and R1L are converted into physical register numbers B2, X2 and R1N. The output of the CHP signal signifies that a register is being written and its content is altered. At this time, the virtual register control circuit 13 newly assigns a physical register which is not used at that time point to the logical register number RCL which is going to be written, and outputs its physical register number as RCN. This new assignment is reflected on the translation means in the virtual register control circuit 13.

Incorporation of the virtual register control circuit 13 does not necessitate significant changes in other portions of the apparatus, except for the register number which becomes the physical register number (the general-purpose register 4 becomes a physical register and the SOW control circuit 8, for example, becomes to hold the physical register number).

Generally, the number of physical registers is set not less than the number of logical registers. However, in order for the present invention to fully exert its effects, the number of physical registers is set to the number of logical registers added by at least the maximum number of registers used for instructions executed concurrently in the apparatus. This arrangement yields many advantages concerning the parallel execution of instructions as will be described in the following.

In virtual register control system, when an instruction which alters the register content (i.e., a C-type instruction) has been decoded, an unused physical register is newly assigned as a register for storing the operational result as described previously. Namely, a C-type instruction does not change the content of the physical register which has stored the operand, but writes the operational result into the newly assigned physical register. The physical register which has held the operand read out by the C-type instruction has its content altered at least after instructions (including S-type instructions) in execution currently are all completed (on the aforementioned premise that the number of physical registers is enough and to spare of at least the maximum number of registers used for instructions in concurrent execution). On this account, the physical register which has held the operand to be read by the S-type instruction is not altered when operand store conflict can be in question. Namely, when operand store conflict can be in question, the U bit stays "1" invariably. As a result, the U bit can be eliminated from the registers 810-i, and the comparators 840-i, 841-i and 842-i, OR gates 860-i, AND gates 861-i and 863-i, and inverters 862-i also become unnecessary.

By the foregoing arrangement of the apparatus, the instruction string shown in FIG. 10 can be executed in parallel in the timing relationship shown in FIG. 11.

Although in the foregoing embodiments the general-purpose registers are used as registers for which storage operand wraparound takes place, the principle can readily be expanded to other registers such as, for example, floating point registers.

Figure 13:
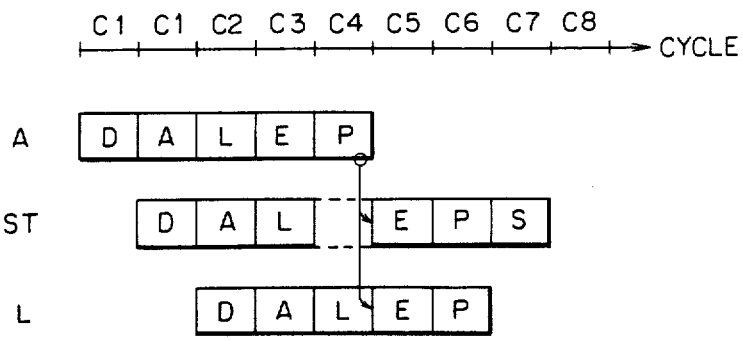
FIGS. 13 and 14 are timing charts showing other embodiments of this invention.

The following describes a further embodiment of this invention. By the provision of a plurality of ALUs for the apparatus shown in FIGS. 5A and 5B so that a plurality of instructions in their E-stage can be executed concurrently, a further enhancement in the processing speed is expected. FIG. 13 is a timing chart for the apparatus of this type to which the present invention is applied in executing an instruction string including instruction ST using the result of instruction A, and instruction L using the same address as the operand address for the ST instruction, and it shows the case that there is no impairing factor for the execution of the ST and L instructions, except for the settlement of the operational result of the A instruction. In this case, the E stage of the L instruction, as of the E stage of the ST instruction, can be executable immediately once the operand to be processed has settled in the general-purpose register 5. Therefore, the E-stage of these instructions can be initiated simultaneously in C6 using separate ALUs.

Figure 14:
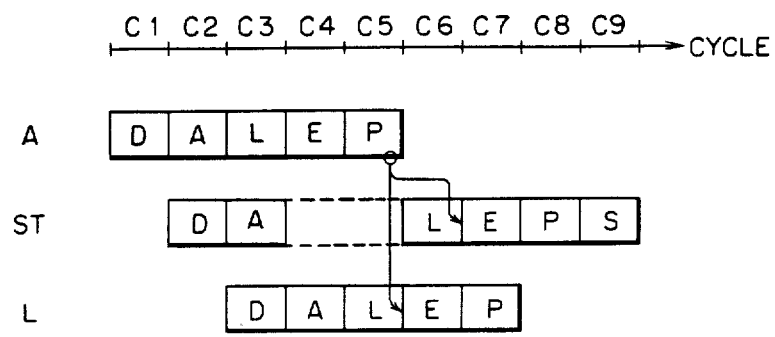

FIG. 14 shows the case of delayed execution for the ST instruction caused by other than operand settlement. Such a delay will occur when, for example, the memory block including the address where the ST instruction writes the operand does not exist in the buffer storage 7. In this case, it becomes necessary to transfer the block from the main storage 12 to the buffer storage 7, creating a blank before the L stage of the ST instruction, and consequently writing into the buffer storage 7 is also delayed. The following L instruction, if it is intended to wait for the end of writing by the ST instruction, cannot begin its E stage until C9 is completed. According to this invention, however, the L instruction can read its operand directly in the general-purpose register 5 which holds the operational result of the A instruction, and can enter the E stage at C6, whereby it can be completed earlier than the E stage of the ST instruction.

According to the present invention, instructions which read out their operands from the storage become executable once the operands have settled in the registers, and do not need to wait for the execution of preceding instructions which write the operands into the storage. On this account, the delay of process caused by operand store conflict is reduced significantly, whereby the effectiveness of parallel processing is further fostered.

We claim:
1. An information processing apparatus for executing a plurality of instructions in parallel comprising:
   storage means for storing operands;
   a group of registers;
   operation means connected to said storage means and said registers;
   means for sequentially decoding supplied instructions and for providing decoded information;

first detection means, connected to said decoding means and responsive to decoding of a first instruction requesting read-out of an operand from an address of said storage means, for detecting a second instruction among instructions in execution using decoded information of the instructions in execution and decoded information of the first instruction, the second instruction being an instruction requesting reading of an operand from one of said registers and writing of the operand to be read, into said addres of said storage means without implementing an operation on the operand to be read; and instruction execution control means connected to said decoding means and said first detection means for controlling execution of decoded instructions, including means responsive to the detection of said second instruction for reading out an operand from one of the registers specified by said second instruction as an operand for the first instruction before the execution of said second instruction has been completed, in place of reading out an operand from said address of said storage means requested by said first instruction.

2. An information processing apparatus according to claim 1, wherein said first detection means comprises means for detecting the second instruction and a third instruction between said first and second instructions which requests writing in said one of said registers specified by said second instruction and for invalidating a detected result of said second instruction when said third instruction has been detected.

3. An information processing apparatus according to claim 2, wherein said first detection means comprises means for detecting whether said second instruction exists by comparing first address data included in said first instruction for operand read-address calculation with second address data included in each of instructions for operand write-address calculation, said instructions each requesting reading of an operand from one of said registers and writing of the operand into said storage means without implementing an operation on the operand.

4. An information processing apparatus according to claim 3, wherein the first and second address data each includes index register number data, base register number data, and displacement data.

5. An, information processing apparatus according to claim 4, wherein said first detection means comprises means for detecting a fourth instruction by respectively comparing the index and base register number data of the second address with write register number data of the instructions between said first and second instructions and for invalidating a detected result of said second instruction when said fourth instruction has been detected.

6. An information processing apparatus according to claim 2, wherein said instruction execution control means comprises:

means connected to said registers and said decoding means for calculating an operand write address or an operand read address for an instruction decoded by said decoding means;

second detection means, connected to said calculating means and said decoding means and responsive to decoding of an instruction requesting reading of an operand from said storage means, for detecting an instruction among instructions decoded earlier than said instruction which requests writing of an operand into an address of said storage means requested by said read-requesting instruction;

means connected to said decoding means and said detect means and responsive to the detection of the write-requesting instruction by said second detection means for delaying operand reading for said read-requesting instruction until operand writing into said storage means by said write-requesting instruction has been completed; and means, connected to said first detect means and said delaying means and responsive to detection of said second instruction by said first detection means, for invalidating a result of detection by said second detection means.

7. An information processing apparatus according to claim 6, wherein said first detection means comprises means for detecting as said second instruction an instruction which specifies an operand write-address range encompassing the address range requested by said first instruction, and wherein said second detection means comprises means for detecting the write-requesting instruction which specifies an operand write-address range which overlaps an operand read-address range specified by the read-requesting instruction.

8. An information processing apparatus according to claim 1, wherein said instruction execution control means comprises means connected to said decoding means for transforming register number data specified by said decoded instruction into different register number data and for supplying said transformed register number data, as register number data specified by said decoded instruction, to said registers.

* * * * *